United States Patent
Lee

(10) Patent No.: US 10,572,152 B2
(45) Date of Patent: Feb. 25, 2020

(54) MEMORY DEVICE HAVING MEMORY BLOCKS AND PROGRAM OPERATION METHOD OF THE SAME

(71) Applicant: SK hynix Inc., Icheon-si, Gyeonggi-do (KR)

(72) Inventor: Hee Youl Lee, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 424 days.

(21) Appl. No.: 15/095,284

(22) Filed: Apr. 11, 2016

(65) Prior Publication Data

US 2017/0131916 A1     May 11, 2017

(30) Foreign Application Priority Data

Nov. 6, 2015  (KR) .......................... 10-2015-0156078

(51) Int. Cl.
  *G06F 3/06*     (2006.01)
(52) U.S. Cl.
  CPC ............ *G06F 3/0608* (2013.01); *G06F 3/064* (2013.01); *G06F 3/0616* (2013.01); *G06F 3/0631* (2013.01); *G06F 3/0652* (2013.01); *G06F 3/0659* (2013.01); *G06F 3/0679* (2013.01)
(58) Field of Classification Search
  CPC .... G06F 3/0659; G06F 3/0631; G06F 3/0616; G06F 3/0652; G06F 3/0679; G06F 3/064
  USPC ................. 711/103, 152, 104, 154
  See application file for complete search history.

(56) References Cited

U.S. PATENT DOCUMENTS

| | | | | |
|---|---|---|---|---|
| 6,711,595 | B1 * | 3/2004 | Anantharao | G06F 12/023 |
| 7,594,093 | B1 * | 9/2009 | Kancherla | G06F 12/04 |
| | | | | 711/203 |
| 9,202,578 | B2 * | 12/2015 | Rhie | G11C 16/16 |
| 9,922,039 | B1 * | 3/2018 | Armangau | G06F 3/0611 |
| 2015/0149710 | A1 * | 5/2015 | Oh | H01L 27/11524 |
| | | | | 711/103 |
| 2016/0124647 | A1 * | 5/2016 | Kim | G06F 3/0679 |
| | | | | 711/167 |
| 2016/0321171 | A1 * | 11/2016 | Kanno | G06F 12/0246 |

FOREIGN PATENT DOCUMENTS

KR     100687424 B1     2/2007
KR     1020130106268 A     9/2013

* cited by examiner

*Primary Examiner* — Tuan V Thai
*Assistant Examiner* — Edward Waddy, Jr.
(74) *Attorney, Agent, or Firm* — William Park & Associates Ltd.

(57) ABSTRACT

Disclosed herein are a memory device and a method of operating the memory device. The memory device may include a memory cell array, a peripheral circuit, and a control logic. The memory cell may a plurality of main memory blocks and a plurality of sub-memory blocks included in each of the main memory blocks. The peripheral circuit may perform a program operation on the main memory blocks or the sub-memory blocks, detect an amount of data loaded for the program operation, and output data amount information. The control logic may control the peripheral circuits so that, during the program operation, at least one memory block is selected from the main memory blocks or from the sub-memory blocks according to the data amount information and the program operation is performed on the selected memory block.

10 Claims, 13 Drawing Sheets

MEMORY DEVICE HAVING MEMORY BLOCKS AND PROGRAM OPERATION METHOD OF THE SAME

CROSS-REFERENCE TO RELATED APPLICATION

The present application claims priority under 35 U.S.C. § 119(a) to Korean patent application number 10-2015-0156078 filed on Nov. 6, 2015, in the Korean Intellectual Property Office, the entire disclosure of which is incorporated herein by reference.

BACKGROUND

1. Technical Field

Various embodiments of the present disclosure generally relate to an integrated circuit and a method of operating the integrated circuit, and more particularly to a memory device capable of performing a program operation and a method of operating the memory device.

2. Related Art

A memory system may include a memory device for storing data and a memory controller for controlling the overall operation of the memory device.

The memory device may include a memory cell array for storing information therein, peripheral circuits for performing program, read, and erase operations on selected memory blocks, and control circuits for controlling the peripheral circuits.

The memory cell array may include a plurality of main memory blocks, and, when a program operation is performed, a main memory block may be selected. For example, in response to a program command, the control logic may select a main memory block on which a program operation is to be performed from among the main memory blocks, and control the peripheral circuits so that the program operation is performed on the selected main memory block.

During a program operation, the amount of data loaded into a memory device may vary. However, the sizes of the main memory blocks are the same as one another regardless of the data sizes they store. If the data size is small, therefore, the selected main memory block uses only a small portion of its storage space. As a result, the data storage efficiency of the memory device may deteriorate.

In general, erase operations are performed on memory block basis. In order to reuse the main memory block already having data in some of its storage space, therefore, an erase operation must be performed on the entire storage space of the main memory block. As a result, the entire storage space of the main memory block may be degraded with repeated erase cycles.

SUMMARY

Various embodiments of the present disclosure are directed to a memory device and a method of operating the memory device, which can efficiently manage memory blocks according to the amount of loaded data during a program operation.

One embodiment of the present disclosure provides a memory device, including a memory cell array including a plurality of main memory blocks and a plurality of sub-memory blocks included in each of the main memory blocks; a peripheral circuit configured to perform a program operation on the main memory blocks or the sub-memory blocks, detect an amount of data loaded for the program operation, and output data amount information; and a control logic configured to control the peripheral circuits so that, during the program operation, at least one memory block is selected from the main memory blocks or from the sub-memory blocks according to the data amount information, and the program operation is performed on the selected memory block.

Another embodiment of the present disclosure provides a memory device, including main memory blocks, each including a plurality of pages; a peripheral circuit configured to perform a program operation on pages selected from the plurality of pages; and a control logic configured to control the peripheral circuits so that parts of the pages are grouped and set as sub-memory blocks according to an amount of data loaded for the program operation and a program operation is performed on pages included in the sub-memory block.

A further embodiment of the present disclosure provides a method of operating a memory device, including storing information about addresses of memory blocks having various storage capacities; loading data for a program operation; selecting a memory block according to both data amount information corresponding to an amount of the loaded data and the address information; and performing a program operation on the selected memory block.

Yet another embodiment of the present disclosure provides a method of operating a memory device, including setting first to $N^{th}$ memory blocks having first to $N^{th}$ different capacities; loading data for a program operation; comparing an amount of the loaded data with the first to $N^{th}$ capacities and selecting any one from the first to $N^{th}$ memory blocks based on a result of the comparison; and performing a program operation on the memory block selected from the first to $N^{th}$ memory blocks.

Still another embodiment of the present disclosure provides a method of operating a memory device, including loading program data into the memory device; setting parts of pages included in a main memory block as a sub-memory block according to an amount of the loaded program data; and performing a program operation on pages included in the sub-memory block.

DETAILED DESCRIPTION

Figure 1:
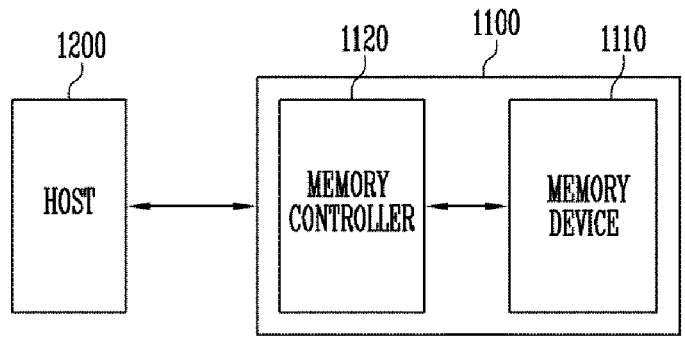
FIG. 1 is a diagram illustrating an example of a memory system according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Hereinafter, embodiments of the present disclosure will be described with reference to the accompanying drawings. The embodiments of the present disclosure are not limited to the following embodiments and may be implemented in various different forms. The present embodiments are intended to make the description of the present disclosure complete, and are provided to fully describe the present disclosure to a person having ordinary knowledge in the art to which the present invention pertains.

FIG. 1 is a diagram illustrating an example of a memory system according to an embodiment of the present disclosure.

Referring to FIG. 1, a memory system 1100 may include a memory device 1110 for storing data and a memory controller 1120 for controlling the memory device 1110 under the control of a host 1200.

The host 1200 may communicate with the memory system 1100 using an interface protocol such as a Peripheral Component Interconnect-Express (PCI-E), Advanced Technology Attachment (ATA), Serial ATA (SATA), Parallel ATA (PATA), or Serial Attached SCSI (SAS). Further, interference protocols between the host 1200 and the memory system 1100 are not limited to the examples discussed above, and may be one of other interface protocols, such as a Universal Serial Bus (USB), a Multi-Media Card (MMC), an Enhanced Small Disk Interface (ESDI), and Integrated Drive Electronics (IDE).

The memory controller 1120 may control the overall operation of the memory system 1100, and may also control data exchange between the host 1200 and the memory device 1110. For example, the memory controller 1120 may program or read data by controlling the memory device 1110 at the request of the host 1200. Further, the memory controller 1120 may perform various operations based on information about main memory blocks and sub-memory blocks of the memory device 1110. In an embodiment, the memory controller 1120 may select main memory blocks and sub-memory blocks of the memory device 1110 to perform a program operation on a main memory block or a sub-memory block according to the amount of data loaded for the program operation. In accordance with an embodiment, the memory device 1110 may include Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR) memory, Rambus Dynamic Random Access Memory (RDRAM), or flash memory.

The memory device 1110 may perform a program, read or erase operation under the control of the memory controller 1120. In an embodiment, each of the main memory blocks of the memory device 1110 may be divided into a plurality of sub-memory blocks having different storage capacities. When a program operation is performed, the memory device 1110 may select a main memory block or a sub-memory block according to the amount of input data, and may perform a program operation on the selected main memory block or sub-memory block.

Figure 2:
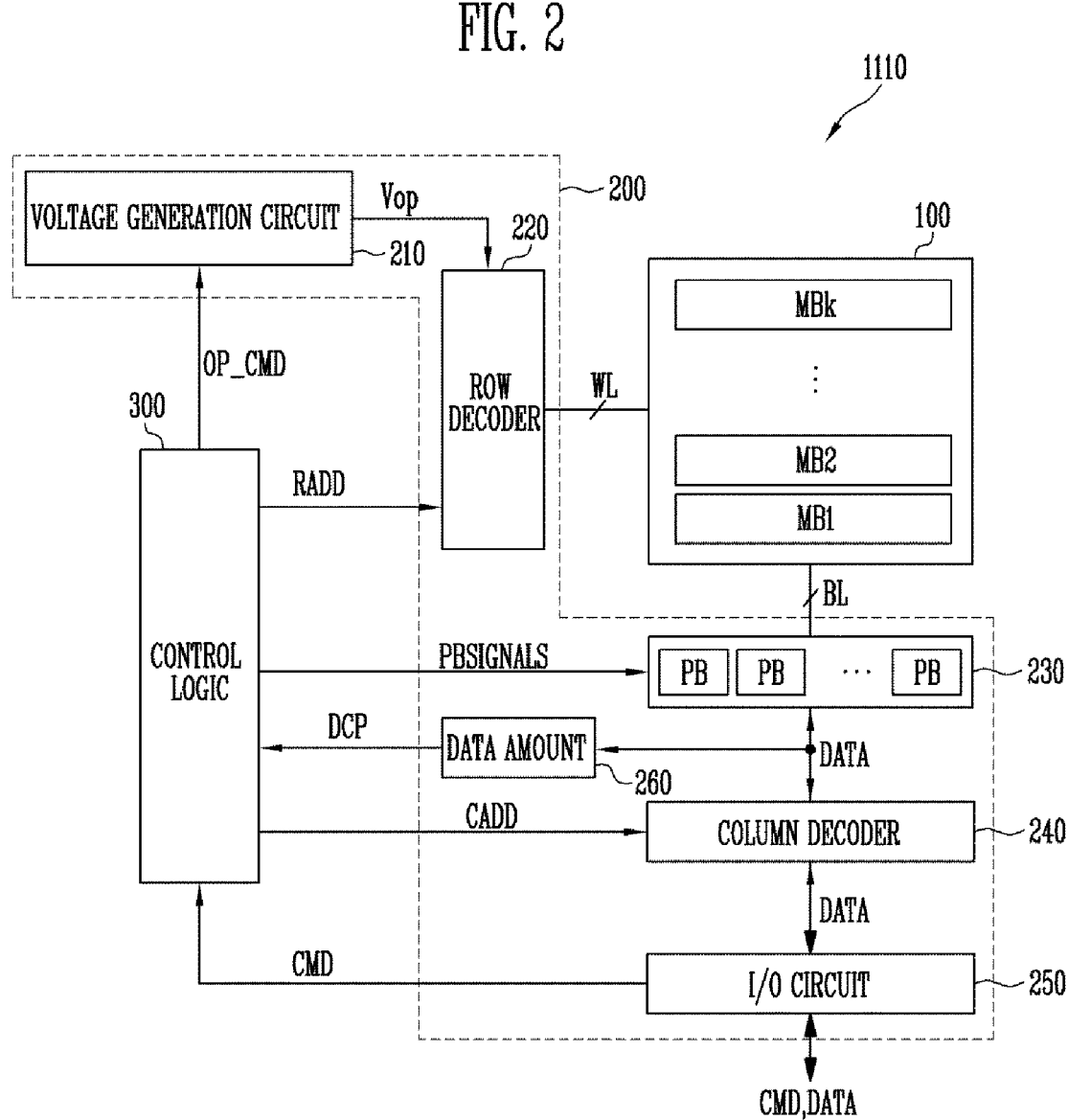
FIG. 2 is a diagram illustrating in detail an example of the memory device of FIG. 1.

FIG. 2 is a diagram illustrating in detail an example of the memory device of FIG. 1.

In an example embodiment, the memory device 1110 may include a non-volatile memory device such as a flash memory.

The memory device 1110 may include a memory cell array 100, peripheral circuits 200, and control logic 300. The peripheral circuits 200 may write data to the memory cell array 100, read data from the memory cell array 100, or erase data from memory cell array 100. The control logic 300 may control the peripheral circuits 200.

The memory cell array 100 may include a plurality of main memory blocks MB1 to MBk (where k is a positive integer). Word lines WLs and bit lines BLs may be coupled to the main memory blocks. The word lines WLs may be coupled to respective main memory blocks MB1 to MBk, and the bit lines BLs may be coupled in common to the main memory blocks MB1 to MBk.

The peripheral circuits 200 may include a voltage generation circuit 210, a row decoder 220, a page buffer 230, a column decoder 240, an input/output (I/O) circuit 250, and a data amount determination circuit 260.

The voltage generation circuit 210 may generate operating voltages Vop having various levels used for program, read, and erase operations in response to an operation signal OP_CMD. In a case of a program operation, the voltage generation circuit 210 may generate program voltages having various levels and operating voltages Vop having various levels required for the program operation. Further, the voltage generation circuit 210 may generate different voltages that may be applied to respective sub-memory blocks that are included in the same main memory block.

The row decoder 220 may transfer the operating voltages Vop to a main memory block or a sub-memory block that is selected in response to a row address RADD.

The page buffer 230 may include a plurality of page buffers PBs coupled to the bit lines BLs. During a program operation, externally received program data may be respectively loaded into the page buffers PBs, and the program data loaded into the PBs may be used to verify the voltages of the bit lines BLs during the program operation.

The column decoder 240 may exchange data with the page buffers PBs in response to a column address CADD.

The I/O circuit 250 may transfer a command CMD received from a memory controller (e.g., the memory controller 1120 of FIG. 1) to the control logic 300 or exchange data DATA with the column decoder 240 or the memory controller.

The data amount determination circuit 260 may determine the amount of data that is input to the memory device 1110 during a program operation and may then output data amount information DCP. In order to determine the amount of data, data DATA transmitted from the column decoder 240 to the page buffer 230 may be used. Alternatively, data DATA input to the I/O circuit 250 or data transmitted from the I/O circuit 250 to the column decoder 240 may also be used. In an embodiment, the amount of data may be determined from the data transmitted from the column decoder 240 to the page buffer 230. The data amount determination circuit 260 may determine the amount of data loaded from the column decoder 240 into the page buffer 230, and may output data amount information DCP corresponding to the amount of data. For example, the amount of data loaded into the page buffer 230 in a program operation may be 8 KB per page. Therefore, when 10 pages are programmed, the amount of loaded data may be 80 KB, and when 100 pages are programmed, the amount of loaded data may be 800 KB. Therefore, the data amount determination circuit 260 may output the data amount information DCP according to the amount of data loaded into the page buffer 230.

The control logic 300 may control the peripheral circuits 200 by providing an operation signal OP_CMD, a row address RADD, and page buffer control signals PBSIGNALS to the peripheral circuits 200 in response to the command CMD and the data amount information DCP. In particular, in response to the command CMD for a program operation, the control logic 300 may output a row address RADD according to the data amount information CDP. For example, when the amount of program data is small, the control logic 300 may output a row address corresponding to a sub-memory block having a small storage capacity, whereas when the amount of program data is large, the control logic 300 may output a row address RADD corresponding to a main memory block or a sub-memory block having a large storage capacity.

In order to output the address of a main memory block or a sub-memory block according to the amount of data loaded into the memory device 1110 for the program operation, the control logic 300 may include a storage circuit for storing information about the addresses of main memory blocks and sub-memory blocks having various storage capacities. Alternatively, the control logic 300 may use information fetched from a separate memory device. The control logic 300 will be described in detail below.

Figure 3:
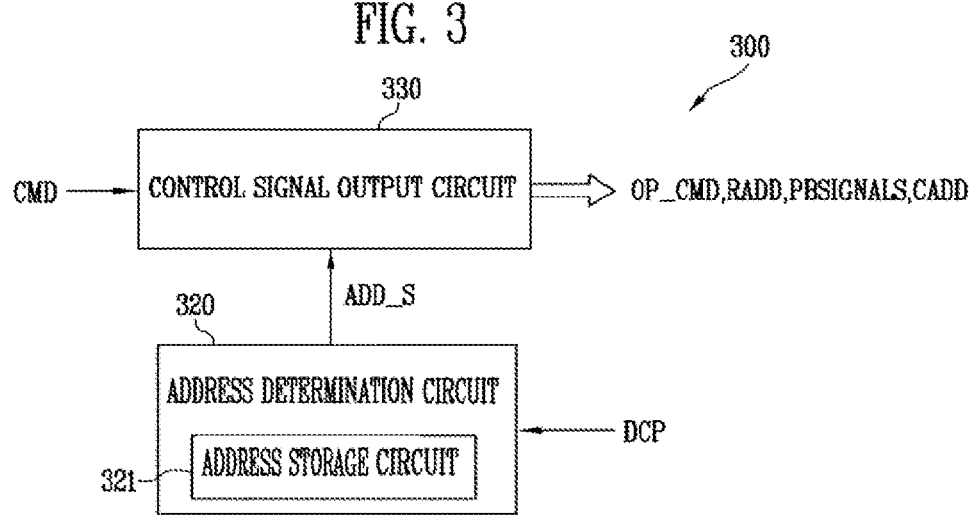
FIG. 3 is a diagram illustrating an example of the control logic of FIG. 2.

FIG. 3 is a diagram illustrating an example of the control logic of FIG. 2.

Referring to FIG. 3, the control logic 300 may include an address determination circuit 320, which may output selected address information ADD_S according to data amount information DCP, and a control signal output circuit 330, which may output control signals OP_CMD, RADD, PBSIGNALS, and CADD in response to a command CMD and the address information ADD_S.

The address determination circuit 320 may include an address storage circuit 321 for storing address information ADD_S of main memory blocks and sub-memory blocks having different storage capacities. The address storage circuit 321 may separately store information about the addresses of free blocks (e.g., erased blocks) and information about the addresses of programmed blocks among the main memory blocks and the sub-memory blocks having different storage capacities. Table 1 shows an example of the address storage circuit 321.

TABLE 1

| | ADD_S | |
|---|---|---|
| | free block (e.g., erased block) | programmed block |
| CP1 | MB1 | |
| CP2 | S_MB1, S_MB3 | S_MB2 |
| CP3 | S_MB6, S_MB7 | S_MB5, S_MB8, S_MB9 |

Referring to Table 1, CP1 to CP3 denote different storage capacities, MB1 denotes a first main memory block, and S_MB1 to S_MB9 denote first to ninth sub-memory blocks. It is assumed that CP1 is the largest storage capacity, CP2 is a storage capacity that is less than CP1, and CP3 is a storage capacity that is less than CP2.

According to the address information stored in Table 1, among memory blocks having a storage capacity of CP1, a free block (e.g., erased block) is the first memory block MB1, and, among memory blocks having a storage capacity of C2, free blocks are the first and third sub-memory blocks S_MB1 and S_MB3 and a programmed block is the second sub-memory block S_MB2, and, among memory blocks having a storage capacity of CP3, free blocks are the sixth and seventh sub-memory blocks S_MB6 and S_MB7, and programmed blocks are the fifth, eighth, and ninth sub-memory blocks S_MB5, S_MB8, and S_MB9.

The address determination circuit 320 may compare the data amount information DCP with information as to the storage capacities CP1 to CP3 stored in the address storage circuit 321, and may output the address information ADD_S of any one of free blocks having the selected storage capacity.

In response to a command CMD for a program operation, the control signal output circuit 330 may output an operation signal OP_CMD for the program operation, page buffer control signals PBSIGNALS, and a column address CADD, and may output a row address RADD depending on the address information ADD_S output from the address determination circuit 320 to control peripheral circuits (e.g., peripheral circuits 200 of FIG. 2). The main memory blocks may be divided into sub-memory blocks having different storage capacities as follows.

Figure 4:
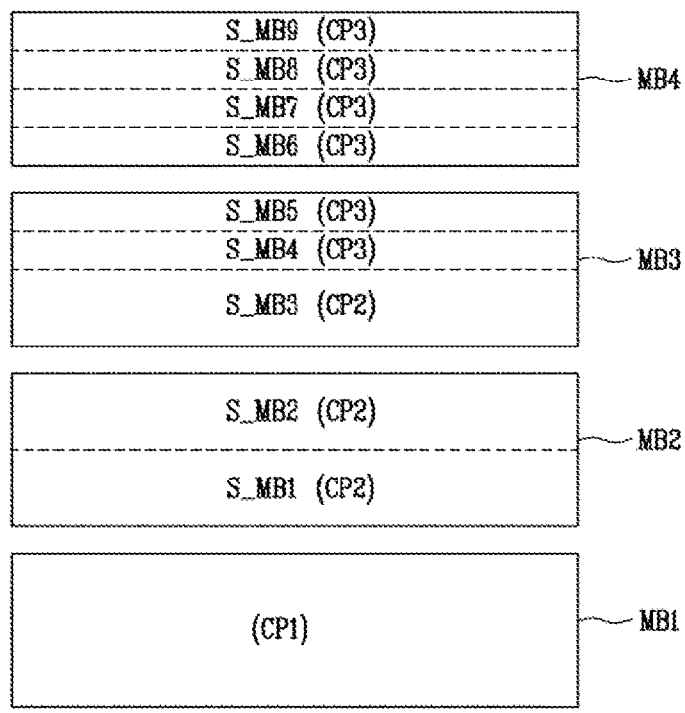
FIG. 4 is a diagram illustrating an example of a method of setting sub-memory blocks according to an embodiment of the present disclosure.

FIG. 4 is a diagram illustrating an example of a method of setting sub-memory blocks according to an embodiment of the present disclosure.

Four main memory blocks MB1 to MB4 illustrated in FIG. 4 are provided as example main memory blocks.

The data storage capacities of the first to fourth main memory blocks MB1 to MB4 are each assumed to be a first capacity CP1. That is, the first to fourth main memory blocks MB1 to MB4 may have the same storage capacity.

For example, the first main memory block MB1 may not include sub-memory blocks.

The second main memory block MB2 may include first and second sub-memory blocks S_MB1 and S_MB2 having the same storage capacity as one another. The first and second sub-memory blocks S_MB1 and S_MB2 may each have a second capacity CP2 that is less than the first capacity CP1. For example, the second capacity CP2 may be half the first capacity CP1. Therefore, the sum of the capacities of the first and second sub-memory blocks S_MB1 and S_MB2 may be the first capacity CP1 that is the storage capacity of the second main memory block MB2.

The third main memory block MB3 may include third to fifth sub-memory blocks S_MB3 to S_MB5. The third sub-memory block S_MB3 may have a second capacity CP2, and the fourth and fifth sub-memory blocks S_MB4 and S_MB5 may each have a third capacity CP3 that is less than the second capacity CP2. For example, the third capacity CP3 may be half the second capacity CP2. Therefore, the sum of the capacities of the third to fifth sub-memory blocks S_MB3 to S_MB5 may be the first capacity CP1 that is the storage capacity of the third main memory block MB3.

The fourth main memory block MB4 may include sixth to ninth sub-memory blocks S_MB6 to S_MB9. The sixth to ninth sub-memory blocks S_MB6 to S_MB9 may each have a third capacity CP3. Therefore, the sum of the capacities of the sixth to ninth sub-memory blocks S_MB6 to S_MB9 may be the first capacity CP1 that is the storage capacity of the fourth main memory block MB4.

As described above, a program operation in accordance with an embodiment may be performed by setting the sub-memory blocks having various storage capacities and by selecting sub-memory blocks according to the amount of data loaded for a program operation. In addition, an erase operation may also be performed on a sub-memory block basis. Therefore, program/erase cycles may be minimized by preventing unselected sub-memory blocks from being programmed and erased. As a result, the unselected sub-memory blocks may be prevented from being degraded with repeated program/erase cycles.

Although FIG. 4 illustrates examples of sub-memory blocks that are divided on a page basis, the sub-memory blocks may be divided on a string or column basis according to an embodiment.

Among the embodiments discussed above, the embodiment in which sub-memory blocks are divided on a page basis will be described in detail below.

Figure 5:
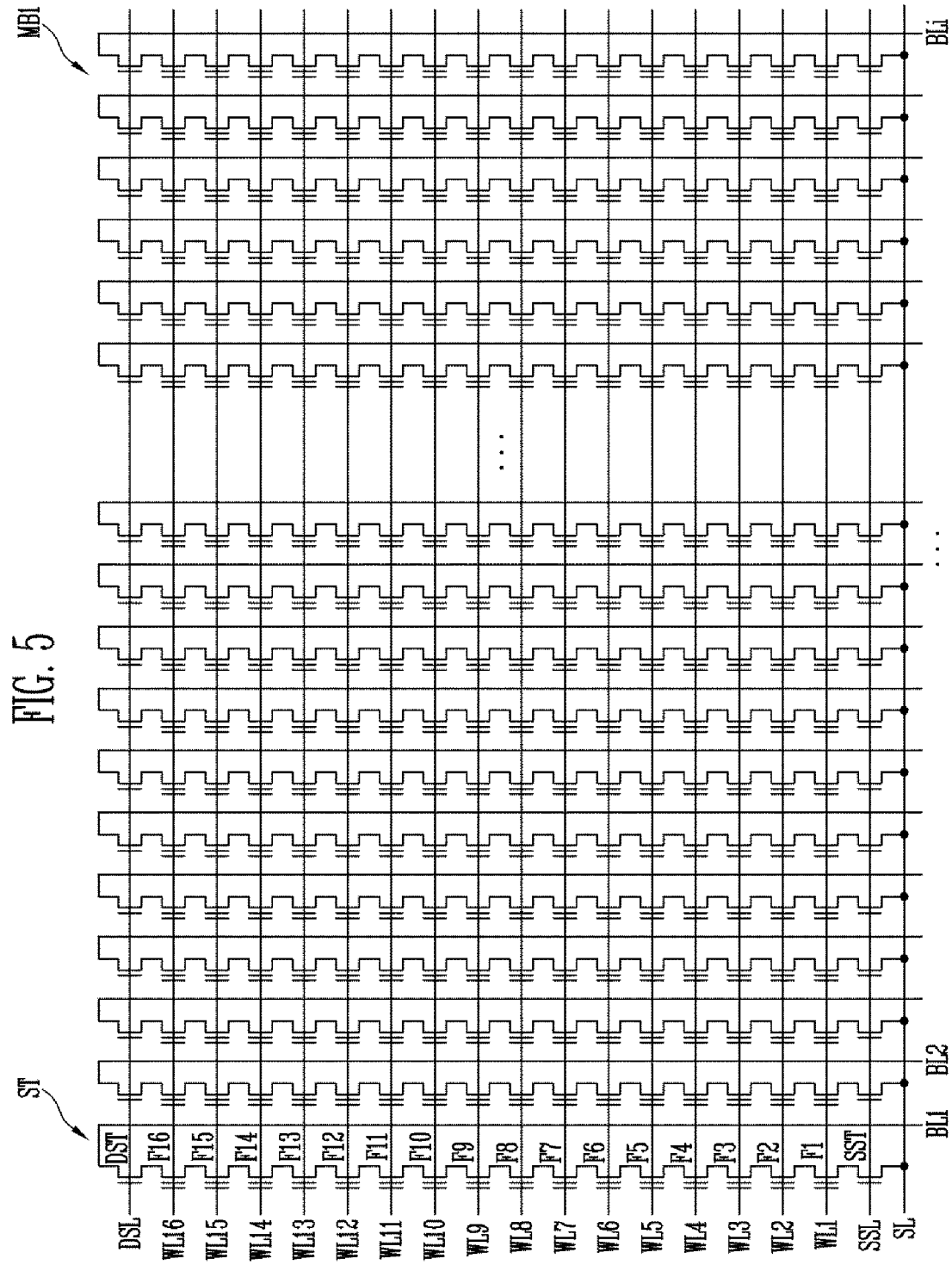
FIGS. 5 to 8 are diagrams illustrating in greater detail examples of the main memory blocks and sub-memory blocks of FIG. 4.
Figure 6:
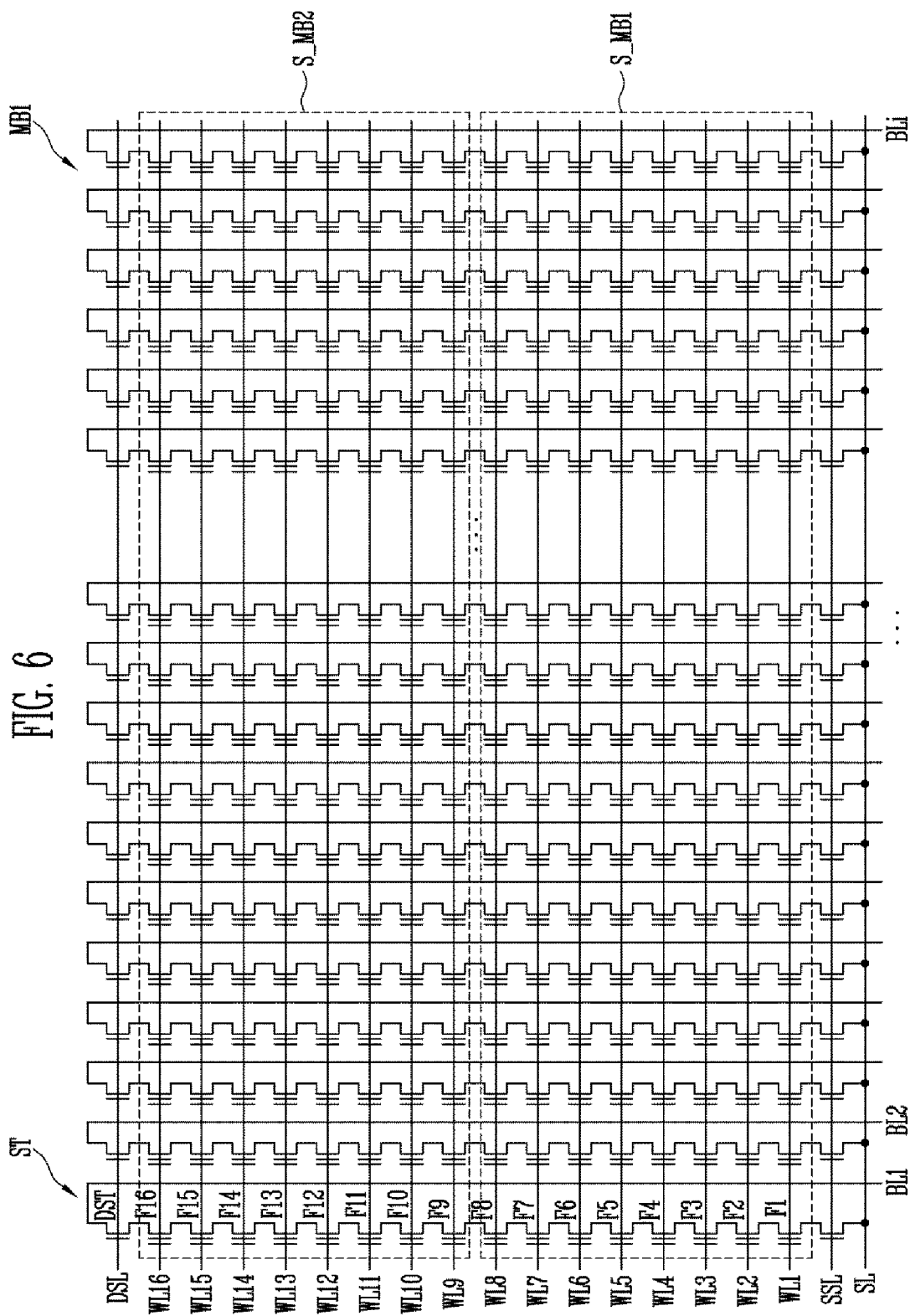
Figure 7:
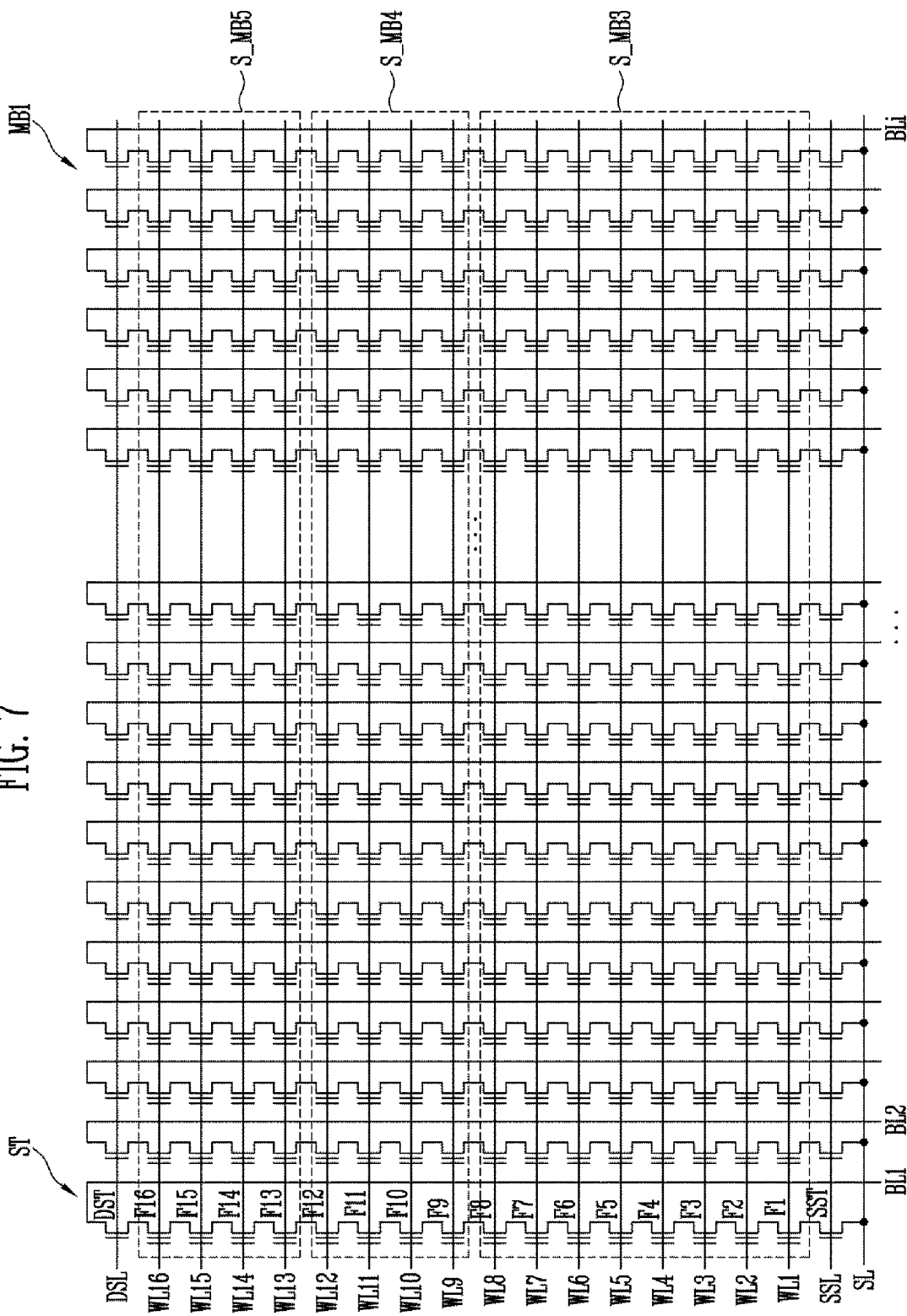
Figure 8:
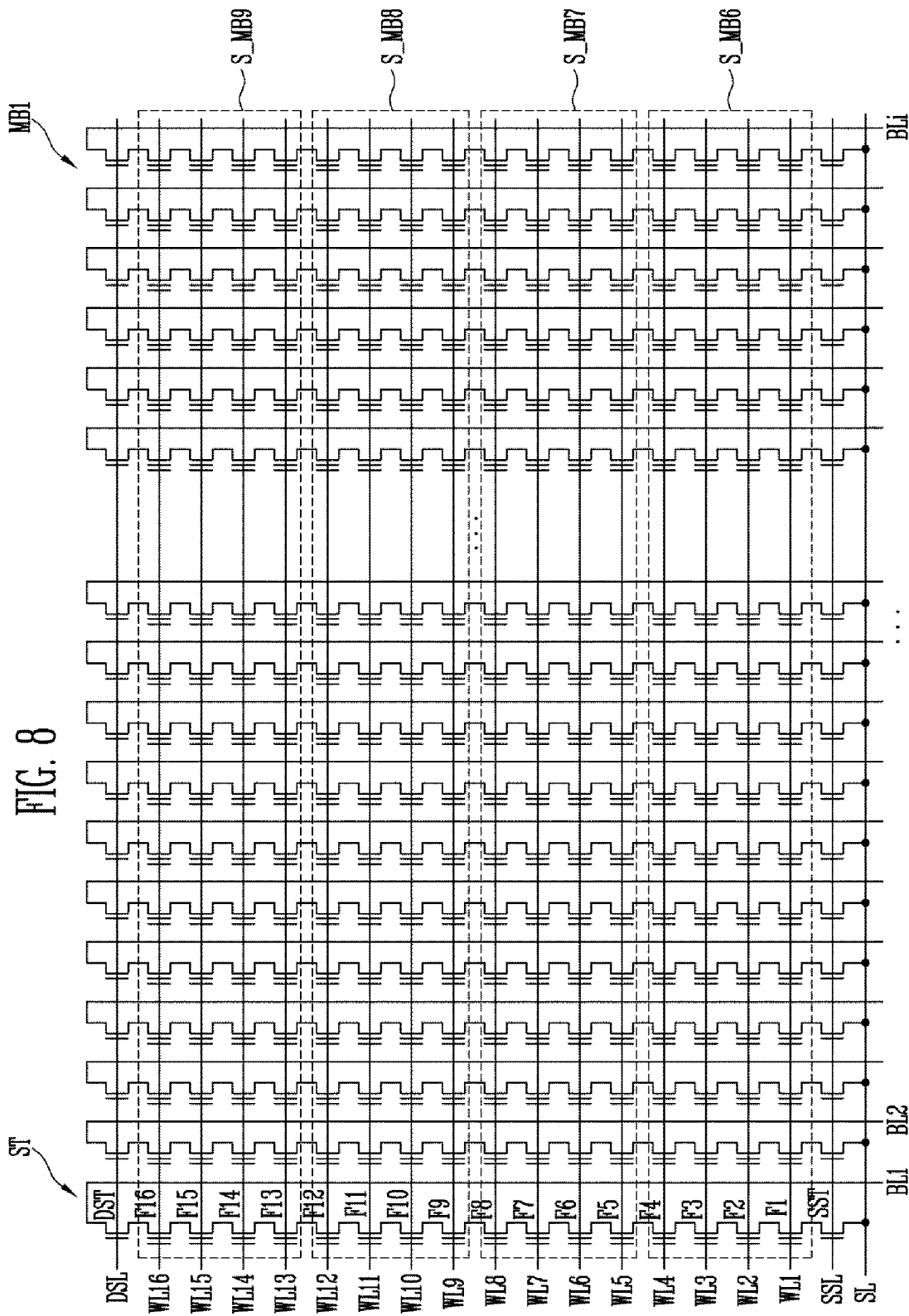

FIGS. 5 to 8 are diagrams illustrating examples of the main memory blocks and sub-memory blocks of FIG. 4. FIG. 5 is a diagram illustrating an example of the first main memory block MB1 of FIG. 4. FIG. 6 is a diagram illustrating an example of the second main memory block MB2 of FIG. 4. FIG. 7 is a diagram illustrating an example of the third main memory block MB3 of FIG. 4. FIG. 8 is a diagram illustrating an example of the fourth main memory block MB4 of FIG. 4.

Referring to FIG. 5, the first memory block MB1 may include a plurality of strings STs coupled between bit lines BL1 to BLi (where i is a positive integer) and a source line SL. The bit lines BL1 to BLi may be coupled to respective strings STs, and the source line SL may be coupled in common to the strings STs. The strings STs may have the same structure, and thus the string ST coupled to the first bit line BL1 will be described by way of example.

The string ST may include a source select transistor SST, first to 16th memory cells F1 to F16, and a drain select transistor DST, which are coupled in series between the source line SL and the first bit line BL1. The source of the source select transistor SST may be coupled to the source line SL, the drain of the drain select transistor DST may be coupled to the first bit line BL1, and the first to 16th memory cells F1 to F16 may be coupled between the source select transistor SST and the drain select transistor DST. The gates of the source select transistors SSTs included in different strings STs may be coupled to the source select line SSL, the gates of the drain select transistors DSTs may be coupled to the drain select line DSL, and the gates of the first to 16th memory cells F1 to F16 may be coupled to first to 16th word lines WL1 to WL16, respectively. The number of the source select transistor SST, the drain select transistor DST, and the first to 16th memory cells F1 to F16, which are included in a single string ST, may differ according to the memory device.

Referring to FIG. 6, the second memory block MB2 may include first and second sub-memory blocks S_MB1 and S_MB2, each having a second capacity CP2, but may be configured in the same way as the first memory block MB1. In order to distinguish the first and second sub-memory blocks S_MB1 and S_MB2 from each other as different blocks, different row addresses may be assigned to the respective sub-memory blocks.

Referring to FIG. 7, the third memory block MB3 may include a third sub-memory block S_MB3 having a second capacity CP2 and fourth and fifth sub-memory blocks S_MB4 and S_MB5, each having a third capacity CP3, but may be configured in the same way as the first memory block MB1. In order to distinguish the third to fifth sub-memory blocks S_MB3 to S_MB5 from each other as different blocks, different row addresses may be assigned to the respective sub-memory blocks.

Referring to FIG. 8, the fourth memory block MB4 may include sixth to ninth sub-memory blocks S_MB6 to S_MB9, each having a third capacity CP3, but may be configured in the same way as the first memory block MB1. In order to distinguish the sixth to ninth sub-memory blocks S_MB6 to S_MB9 from each other as different blocks, different row addresses may be assigned to the respective sub-memory blocks.

Information about addresses respectively assigned to the first main memory block MB1 and the first to ninth sub-memory blocks S_MB1 to S_MB9 may be stored in an address storage circuit (e.g., the address storage circuit 321 of FIG. 3).

Figure 9:
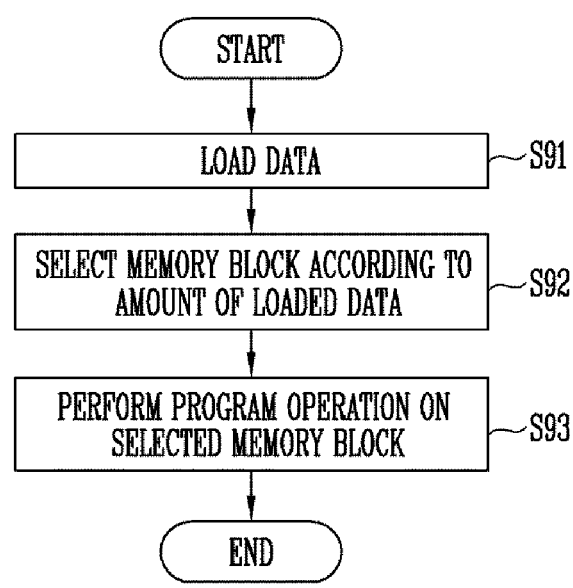
FIG. 9 is a flowchart illustrating an example of a program operation according to an embodiment of the present disclosure.

FIG. 9 is a flowchart illustrating an example of a program operation according to an embodiment of the present disclosure.

Referring to FIG. 9, after the main memory blocks and the sub-memory blocks having various capacities have been set, data may be loaded into a memory device (e.g., the memory device 1110 of FIG. 2) at a step S91. For example, the data may be loaded into a page buffer (e.g., the page buffer 230 of FIG. 2) of the memory device. When the data is loaded into the page buffer, a memory block on which a program operation is to be performed may be selected according to the amount of the loaded data at a step S92. In particular, the memory block may be selected in consideration of the amount of the loaded data and the storage capacities of the respective memory blocks. When the memory block on which the program operation is to be performed may be selected, the program operation is performed on the selected memory block at a step S93.

Figure 10:
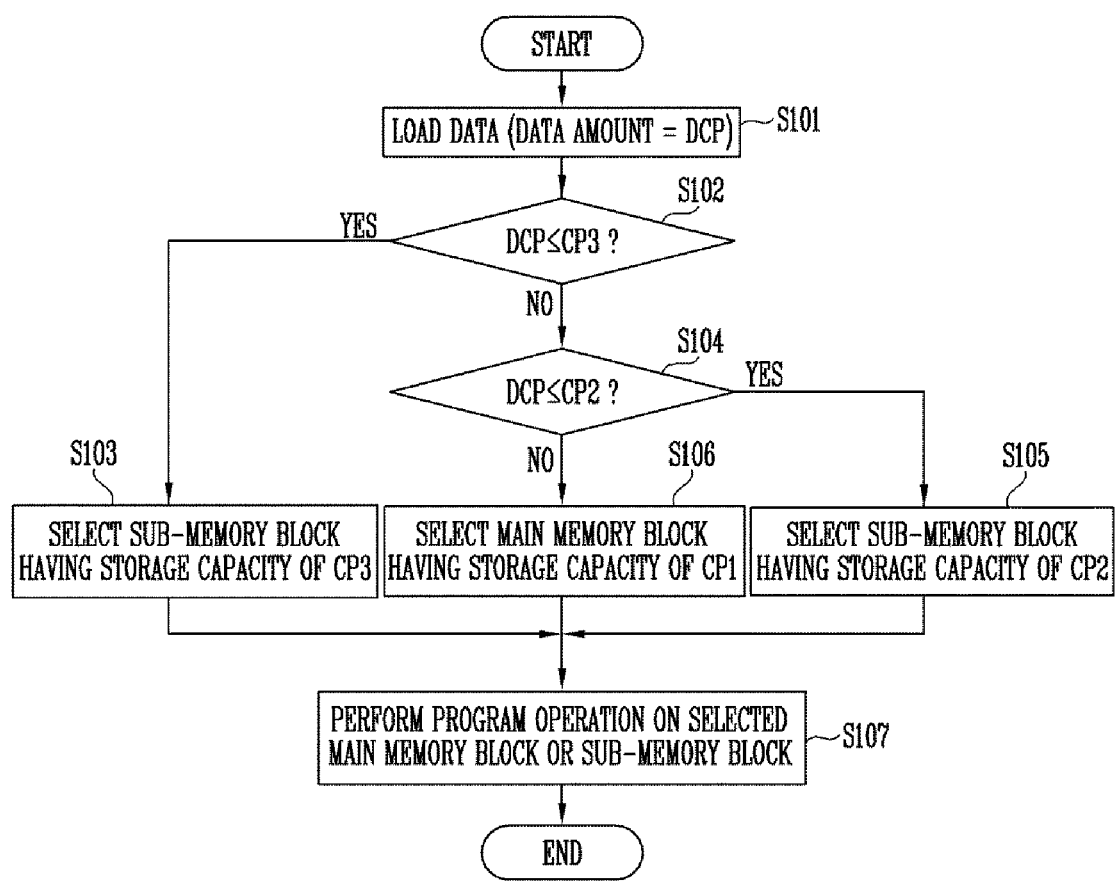
FIG. 10 is a flowchart illustrating in detail an example of the program operation of FIG. 9.

FIG. 10 is a flowchart illustrating in detail an example of the program operation of FIG. 9.

Referring to FIG. 10, data for the program operation may be loaded into a memory device (e.g., the memory device 1110 of FIG. 2) at a step S101. At this time, information about the amount of the data (e.g., the data amount information DCP of the data) loaded into the memory device may be detected by a data amount determination circuit (e.g., the data amount determination circuit 260 of FIG. 2).

Among the storage capacities of the main memory blocks and the sub-memory blocks, the third capacity CP3 corresponding to the smallest storage capacity is compared with the data amount information DCP at a step S102. For example, it is determined whether the amount of the loaded data, which is the data amount information DCP of the data, is less than or equal to the third capacity CP3.

When the data amount information DCP is less than or equal to the third capacity CP3, any one of the sub-memory blocks having a storage capacity of the third capacity CP3 may be selected at a step S103. That is, since the amount of data loaded for the program operation is less than the third capacity CP3, the data may be programmed in a sub-memory block having the third capacity CP3. Therefore, one of the sub-memory blocks having the third capacity CP3 may be selected.

When the data amount information DCP is greater than the third capacity CP3, the second capacity CP2 that is a storage capacity greater than the third capacity CP3 may be compared with the data amount information DCP at a step S104.

When the data amount information DCP is less than or equal to the second capacity CP2, any one of the sub-memory blocks having a storage capacity of the second capacity CP2 may be selected at a step S105. That is, since the amount of the data loaded for the program operation is less than the second capacity CP2, the data may be programmed in the selected sub-memory block having the second capacity CP2.

When the data amount information DCP is greater than the second capacity CP2, any one of the main memory blocks having the first capacity CP1 corresponding to the largest storage capacity may be selected at a step S106.

Then, at a step S107, a program operation may be performed on the main memory block or the sub-memory block selected at the step S103, S105 or S106.

Figure 11:
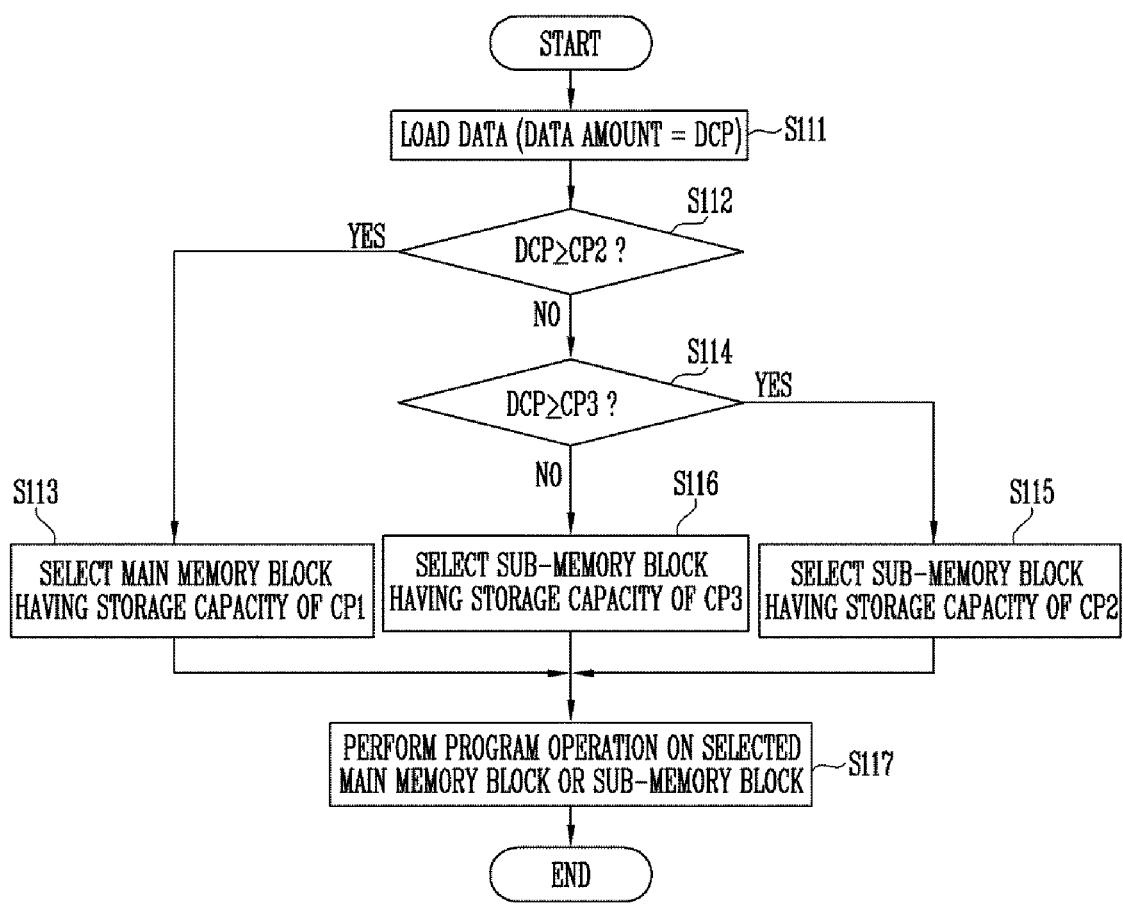
FIG. 11 is a flowchart illustrating in detail an example of the program operation of FIG. 9.

FIG. 11 is a flowchart illustrating in detail an example of the program operation of FIG. 9.

Referring to FIG. 11, data for a program operation is loaded into a memory device (e.g., the memory device 1110 of FIG. 2) at a step S111. At this time, information about the amount of the data (e.g., the data amount information DCP) loaded into the memory device may be detected by a data amount determination circuit (e.g., the data amount determination circuit 260 of FIG. 2).

Among the storage capacities of the main memory blocks and the sub-memory blocks, the second capacity CP2 corresponding to a median storage capacity is compared with the data amount information DCP at a step S112. For example, it is determined whether the amount of the loaded data, which is the data amount information DCP, is equal to or greater than the second capacity CP2.

When the data amount information DCP is equal to or greater than the second capacity CP2, any one of the main memory blocks having the first capacity CP1 corresponding to the largest storage capacity may be selected at a step S113. That is, since the amount of data loaded for the program operation is greater than the second capacity CP2, the data may be programmed in the main memory block having the first capacity CP1 greater than the second capacity CP2. Therefore, any one of the main memory blocks having the first capacity CP1 may be selected as a block to be programmed.

When the data amount information DCP is less than the second capacity CP2, the third capacity CP3 may be compared with the data amount information DCP at a step S114. For example, it is determined whether the amount of loaded data DCP is equal to or greater than the third capacity CP3.

When the data amount information DCP is equal to or greater than the third capacity CP3, any one of the sub-memory blocks having a storage capacity of the second capacity CP2 may be selected at step S115. That is, since the amount of the data loaded for the program operation is less than the second capacity CP2 and is greater than the third capacity CP3, the loaded data may be programmed in the selected sub-memory block having the second capacity CP2.

When the data amount information DCP is less than the third capacity CP3, any one of the sub-memory blocks having the third capacity CP3 corresponding to the smallest storage capacity may be selected at a step S116.

Then, at a step S117, a program operation may be performed on the main memory block or the sub-memory block selected at the step S113, S115 or S116.

Figure 12:
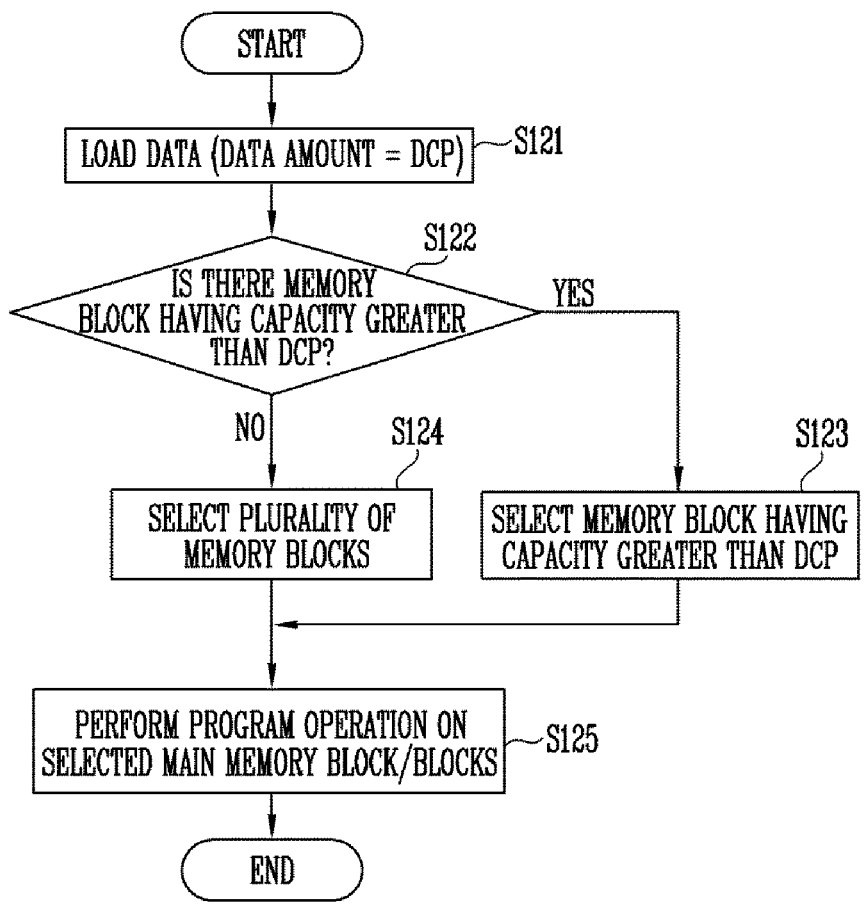
FIG. 12 is a flowchart illustrating in detail an example of the program operation of FIG. 9.

FIG. 12 is a flowchart illustrating in detail an example of the program operation of FIG. 9.

Referring to FIG. 12, data for a program operation may be loaded into a memory device (e.g., the memory device 1110 of FIG. 2) at a step S121. Here, information about the amount of the data (e.g., the data amount information DCP of the data) loaded into the memory device 1110 may be detected by a data amount determination circuit (e.g., the data amount determination circuit 260 of FIG. 2).

At a step S122, it is determined whether a memory block having a storage capacity greater than the amount of the loaded data (e.g., the data amount information DCP) is present among free memory blocks (e.g., erased memory blocks).

When the memory block having a storage capacity greater than the amount of the loaded data (e.g., the data amount information DCP) is present, any one of the free memory blocks (e.g., erased memory blocks) having a storage capacity greater than the amount of the loaded data (e.g., the data amount information DCP) may be selected at a step S123.

When there is no memory block having a storage capacity greater than the amount of the loaded data (e.g., the data amount information DCP), a plurality of the free memory blocks (e.g., erased memory blocks) may be selected at a step S124. Here, the memory blocks are selected so that the sum of the storage capacities of the plurality of memory blocks is greater than the amount of the loaded data.

Thereafter, a program operation may be performed on the selected memory block or the selected memory blocks at a step S125. When the plurality of memory blocks are selected, the program operation may be sequentially performed on memory blocks from a selected memory block having a lower address.

In the program methods described above with reference to FIGS. 9 to 12, before data is loaded, sub-memory blocks having various capacities may be preset, and a sub-memory block or a main memory block may be selected based on the result of comparing the capacities of the preset sub-memory blocks or main memory blocks with the amount of loaded data.

In an embodiment, sub-memory blocks may be variably set according to the amount of loaded data after the data has been loaded without presetting the sub-memory blocks.

Figure 13:
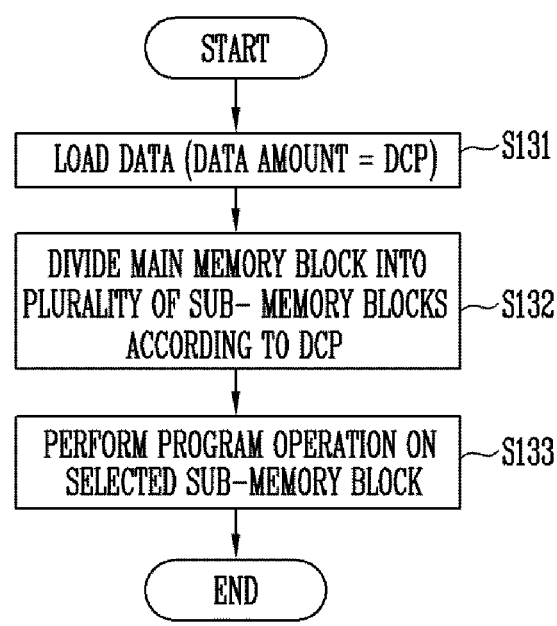
FIG. 13 is a flowchart illustrating an example of a program operation according to an embodiment of the present disclosure.

FIG. 13 is a flowchart illustrating an example of a program operation according to an embodiment of the present disclosure.

Referring to FIG. 13, data for a program operation may be loaded into a memory device (e.g., the memory device 1110 of FIG. 2) at a step S131. At this time, the amount of the data (e.g., the data amount information DCP) loaded into the memory device 1110 may be detected by a data amount determination circuit (e.g., the data amount determination circuit 260 of FIG. 2).

Depending on information as to the amount of data received from the data amount determination circuit 260, the control logic 300 of the memory device 1110 may divide one of free main memory blocks (e.g., erased memory blocks) into a plurality of sub-memory blocks at a step S132. For example, some of memory cells included in the selected main memory block may be set as a sub-memory block. The storage capacity of the sub-memory block may be set to be greater than the amount of loaded data. The set sub-memory block may be a sub-memory block selected for a program operation. Among the memory cells included in the selected main memory block, remaining memory cells that are not included in the selected sub-memory block may be additionally set as other sub-memory blocks having various capacities. The step of setting the remaining memory cells as other sub-memory blocks may be omitted.

Then, a program operation may be performed on the selected sub-memory block at a step S133.

In the program operation discussed above, the capacity of the sub-memory block may be set according to the amount of data. A method of varying the capacity of the sub-memory block in this way will be described in detail below.

Figure 14:
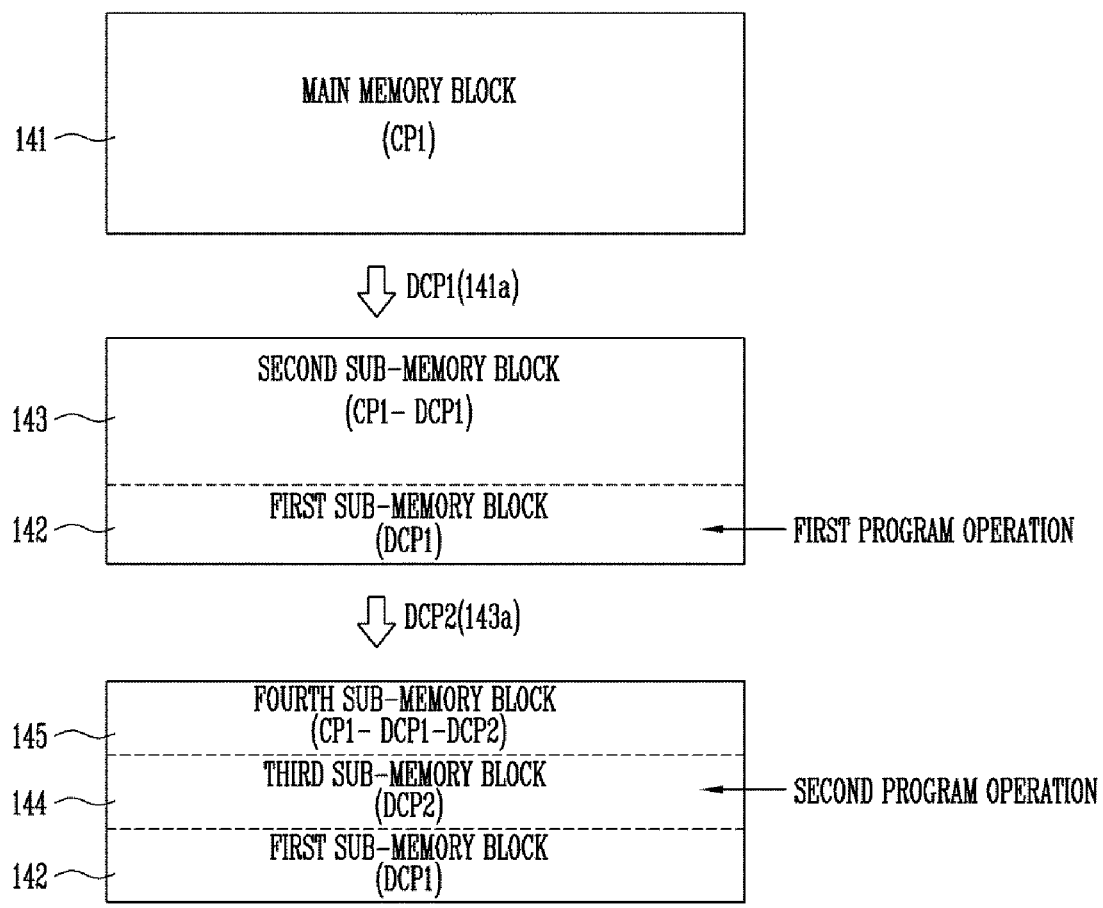
FIG. 14 is a diagram illustrating an example of a method of setting sub-memory blocks according to the embodiment of FIG. 13.

FIG. 14 is a diagram illustrating a method of setting sub-memory blocks according to the embodiment of FIG. 13.

Referring to FIG. 14, it is assumed that the storage capacity of a main memory block 141 that is in an erased state is a first capacity CP1.

Data for a first program operation may be loaded into the memory device 1110 (of FIG. 2) (141a). Here, the amount of loaded data is assumed to be a first data amount DCP1.

Some memory cells included in the main memory block 141 may be set as a first sub-memory block 142. For example, memory cells included in the first sub-memory block 142 may be divided on a page basis. A page means a group of memory cells coupled to the same word line, and a plurality of pages are included in the main memory block. The storage capacity of the first sub-memory block 142 is greater than the first data amount DCP1. That is, the first sub-memory block 142 is designated to include at least the first data amount DCP1. Therefore, the storage capacity of a second sub-memory block 143 is a value obtained by subtracting the first data amount CDP1 from the first capacity CP1.

Once the first sub-memory block 142 is set, a first program operation may be performed on the first sub-memory block 142.

When a second program operation, which is a program operation performed after the first program operation has been completed, is performed, data for the second program operation may be loaded into the memory device 1110 (143a). Here, the amount of loaded data is assumed to be a second data amount DCP2.

Since the first sub-memory block 142 is in the state in which the first program operation has been completed, some memory cells included in the second sub-memory block 143 may be set as a third sub-memory block 144. Here, the storage capacity of the third sub-memory block 144 is greater than the second data amount DCT2. That is, the third sub-memory block 144 is designated to include at least the second data amount DCP2. Once the third sub-memory block 144 is set, a second program operation may be performed on the third sub-memory block 144.

When the third sub-memory block 144 is designated to have the second data amount DCP2, remaining memory cells other than the first and third sub-memory blocks 142 and 144, among the memory cells included in the main memory block 141, may be set to a fourth sub-memory block 145. Therefore, the storage capacity of the fourth sub-memory block 145 may be a value obtained by subtracting the first and second data amounts DCP1 and DCP2 from the first capacity CP1. The fifth sub-memory block 145 may be used when a subsequent program operation is performed, or may be selected and used together with a plurality of sub-memory blocks when a program operation is performed on a large amount of loaded data. A control logic (e.g., the control logic 300 of FIG. 2) may store the addresses of newly set sub-memory blocks, and may control the peripheral circuits 200 so that a sub-memory block is selected according to the corresponding address during a program operation.

In FIG. 14, sub-memory blocks may be divided on a page basis, but sub-memory blocks may be divided on a string or column basis according to an embodiment.

Figure 15:
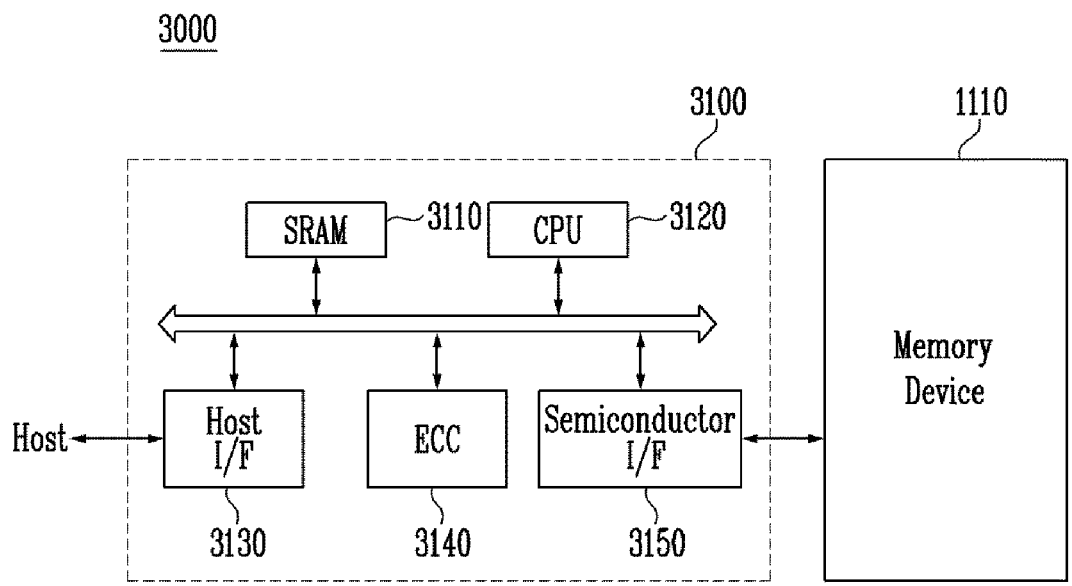
FIG. 15 is a diagram illustrating an example of a memory system including a memory device according to an embodiment of the present disclosure.

FIG. 15 is a diagram illustrating a memory system including a memory device according to an embodiment of the present disclosure.

A memory controller 3100 may include an SRAM 3110, a CPU 3120, a host interface (Host I/F) 3130, an error correction circuit (ECC) 3140, and a semiconductor interface (Semiconductor I/F) 350, and may control a memory device 1110. The SRAM 3110 may be used as a working memory for the CPU 3120. The host interface 3130 may have a data exchange protocol for a host interfacing with the memory system 3000. The error correction circuit 3140 provided in the memory controller 3100 may detect and correct errors included in data read from the memory device 1110. The semiconductor interface 3150 may interface with the memory device 1110. The CPU 3120 may perform a control operation for data exchange in the memory controller 3100. Although not illustrated in FIG. 15, the memory system 3000 may be further provided with a ROM or the like for storing code data required to interface with the host.

The memory controller 3100 may control the memory device 1110 so that a main memory block or a sub-memory block included in the memory device 1110 is selected according to the amount of loaded data during a program operation and so that a program operation is performed on the selected memory block. For example, information about the main memory blocks and sub-memory blocks divided according to the storage capacity may be stored in the SRAM 3110. During a program operation, the CPU 3120 may control the memory device 1110 so that a main memory block or a sub-memory block is selected according to the amount of data loaded from the host and the information about the memory blocks stored in the SRAM 3110. Alternatively, the CPU 3120 may control the memory device 1110 so that the storage capacity of the sub-memory block is set according to the loaded data and a program operation is performed on the set sub-memory block.

The memory system 300 according to an embodiment of the present disclosure system 3000 may be applied to a computer, a Ultra Mobile PC (UMPF), a workstation, a net-book, a PDA, a portable computer, a web tablet, a wireless phone, a mobile phone, a smart phone, a digital camera, a digital audio recorder, a digital audio player, a digital picture recorder, a digital picture player, a digital video recorder, a digital video player, a device capable of transmitting/receiving information in a wireless environment, or one of various devices constituting a home network.

Figure 16:
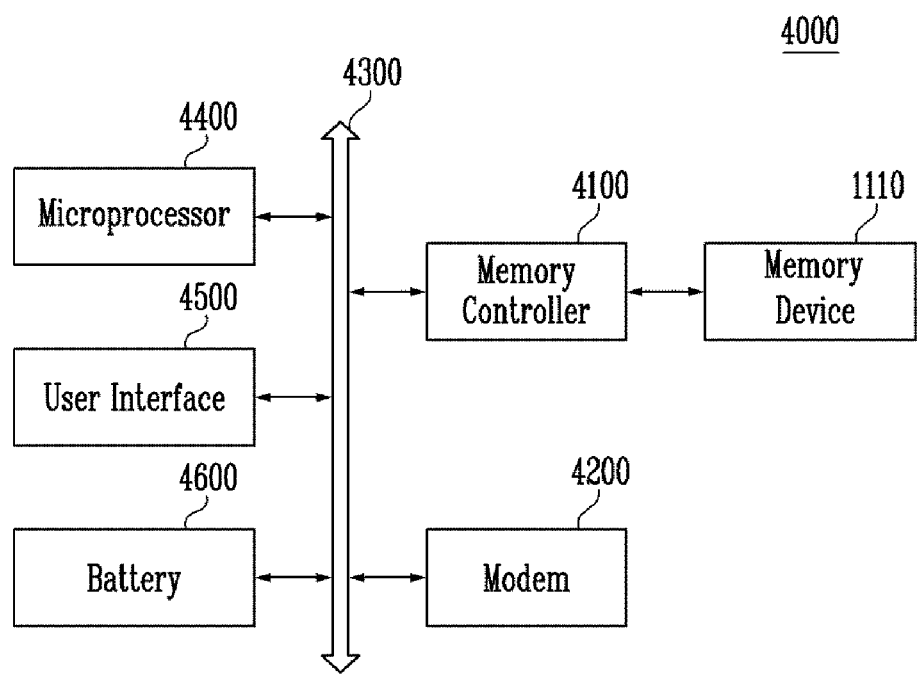
FIG. 16 is a diagram illustrating an example of a computing system including a memory device according to an embodiment of the present disclosure.

FIG. 16 is a diagram illustrating a computer system including a memory device according to an embodiment of the present disclosure.

Referring to FIG. 16, a computing system 4000 according to an embodiment of the present disclosure may include a memory device 1110, a memory controller 4100, a modem 4200, a microprocessor 4400, and a user interface 4500, which are electrically connected to a bus 4300.

When the computing system 4000 according to an embodiment of the present disclosure is a mobile device, a battery 4600 for supplying an operating voltage to the computing system 4000 may be further included. Although not illustrated in the drawing, the computing system 4000 according to an embodiment of the present disclosure may further include an application chip set, a Camera Image Processor (CIS), a mobile DRAM, or the like.

Since the memory device 1110 may have the same or substantially the same configuration as that of FIG. 2, a detailed description thereof will be omitted.

The memory controller 4100 and the memory device 1110 may constitute a Solid State Drive/Disk (SSD).

The system according to an embodiment of the present disclosure may be made using various types of packages. For example, the system of the present disclosure may be made using Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), and Wafer-Level Processed Stack Package (WSP).

Various embodiments of the present disclosure may efficiently manage memory blocks according to the amount of loaded data during a program operation. Further, since program/erase cycles may be minimized by preventing unselected sub-memory blocks from being programmed and erased, stress on the memory cells may be reduced, and the reliability of the memory device may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory device, comprising:
a memory cell array including a plurality of main memory blocks and a plurality of sub-memory blocks included in each of the main memory blocks, wherein the sub-memory blocks are set according to storage capacities;
a peripheral circuit configured to perform a program operation on the main memory blocks or the sub-memory blocks, detect an amount of data loaded for the program operation, and output data amount information corresponding to the data loaded for the program operation; and
a control logic configured to control the peripheral circuits so that, during the program operation, at least one of the memory blocks or the sub-memory blocks is selected from the main memory blocks or the sub-memory blocks according to the data amount information, and the program operation is performed on the selected memory block,
wherein the control logic divides the sub-memory blocks which are in an erase status into a plurality of sub-memory blocks again after the program operation is performed.

2. The memory device according to claim 1, wherein the peripheral circuits comprise:
a page buffer configured to load externally received data in response to page buffer control signals during the program operation, and control voltages of bit lines coupled to the memory cell array based on the loaded data; and
a data amount determination circuit configured to detect the amount of loaded data and output the data amount information.

3. The memory device according to claim 2, wherein the data amount determination circuit is configured to detect the data loaded into the page buffer and then output the data amount information.

4. The memory device according to claim 1, wherein the control logic comprises:
an address determination circuit configured to output selected address information by comparing the storage capacities of the main memory blocks and the sub-memory blocks with the data amount information; and
a control signal output circuit configured to output an operation signal, a row address, page buffer control signals, and a column address in response to the selected address information and a command.

5. The memory device according to claim 4, wherein the address determination circuit comprises an address storage circuit configured to store address information about addresses of the main memory blocks and the sub-memory blocks having different storage capacities.

6. The memory device according to claim 5, wherein the address information are classified depending on the storage capacities and whether the memory blocks are free memory blocks or programmed memory blocks.

7. The memory device according to claim 6, wherein the address determination circuit outputs the selected address information corresponding to a memory block having a storage capacity that is equal to or greater than the data amount among free main memory blocks or free sub-memory blocks, among the address information.

8. A memory device, comprising:
main memory blocks, each including a plurality of pages;
a peripheral circuit configured to perform a program operation on pages selected from the plurality of pages; and
a control logic configured to control the peripheral circuits so that parts of the pages are grouped and set as sub-memory blocks according to an amount of data loaded for the program operation and a program operation is performed on pages included in the sub-memory block,
wherein the control logic groups the sub-memory blocks which are in an erase status into a plurality of sub-memory blocks again after the program operation is performed.

9. The memory device according to claim 8, wherein the control logic comprises:
an address determination circuit configured to output information about an address of the sub-memory block set according to the data amount; and a control signal output circuit configured to output an operation signal, a row address, page buffer control signals, and a column address that are required to control the peripheral circuits, in response to the address and a command.

10. The memory device according to claim 9, wherein the address determination circuit comprises an address storage circuit configured to store the information about the address of the sub-memory block.

* * * * *